United States Patent Office 3,632,671
Patented Jan. 4, 1972

3,632,671
ADHESIVE COMPOSITION
Junji Furukawa and Shinzo Yamashita, Kyoto, Kunihiko Ikkaku and Norio Kitahara, Kobe, Shozo Maeda, Nishinomiya-shi, and Shigeru Tajima, Ashiya-shi, Japan, assignors to Sumitomo Chemical Company, Ltd., Osaka, and Sakai Chemical Industry Co., Ltd., Kobe, Japan
No Drawing. Filed May 22, 1967, Ser. No. 640,325
Claims priority, application Japan, Oct. 19, 1965, 40/64,021; May 26, 1966, 41/33,926, 41/33,927
Int. Cl. C09j
U.S. Cl. 260—876    10 Claims

ABSTRACT OF THE DISCLOSURE

The present disclosure is directed to adhesive compositions containing a halogenated lowly unsaturated rubber. In particular, it has been found that adhesive compositions containing as a main component a halogenated lowly unsaturated rubber having a halogen content of 13 to 50 percent by weight produced by reacting a halogen or halogens with a terpolymer consisting of ethylene, a higher $\alpha$-olefin than ethylene and a non-conjugated diolefin, a mixed polymerizate produced by polymerizing unsaturated compounds with said halogenated lowly unsaturated rubber, a mixture consisting of said halogenated lowly unsaturated rubber and said mixed polymerizate or a mixture consisting of said halogenated lowly unsaturated rubber and a mixed polymerizate produced by polymerizing unsaturated compounds with said terpolymers are effective in producing a bond between compounded rubbers or between a compounded rubber and a metal, natural fiber, regenerated fiber, synthetic fiber or the like.

---

The present invention relates to adhesive compositions which are effective in producing a bond between compounded rubbers or between a compounded rubber and a metal, natural fiber, regenerated fiber, synthetic fiber or the like. More particularly, the invention relates to adhesive compositions which may produce a strong and complete adhesion between the same or different compounded rubbers, particularly between compounded lowly unsaturated rubbers containing a large amount of a processing oil or between a compounded lowly unsaturated rubber and a compounded highly unsaturated rubber or between any one of the above-mentioned compounded rubber and a metal such as mild steel, brass, or the like or a fiber such as cotton, rayon, nylon or the like. As used herein, the term "lowly unsaturated rubber" is meant to include, for example, butyl rubber (an isobutylene-isoprene copolymer), an ethylene-propylene-nonconjugated diolefin terpolymer, etc. The term "highly unsaturated rubber" is meant to include polyisoprene rubber, polybutadiene rubber, a styrene-butadiene copolymer rubber, an acrylonitrile-butadiene copolymer rubber, polychloroprene rubber, etc.

To produce such a bond rubber doughs obtained by simply dissolving compounded rubbers in organic solvents or a mixture thereof with isocyanates have been heretofore used. However, such processes have not provided a sufficiently satisfactory adhesion. Particularly, in the adhesion between different compounded rubbers such as between a compounded lowly unsaturated rubber and a compounded highly unsaturated rubber these processes have been unsatisfactory owing to the difference in polarity between the base of the rubber dough and the materials to be bonded and the difference in rate of vulcanization between these materials. In the adhesion of compounded rubbers containing a large amount of a processing oil such as lowly unsaturated rubbers, also, no satisfactory result has been obtained because the processing oil contained in the compounded rubbers to be bonded migrates to the adhesive layer and reduces adhesive strength. This has raised a serious problem in the manufacture of rubber industrial articles, tyre, rubber footwear, etc.

Belgian Pat. No. 68,665 discloses that a lowly unsaturated rubber obtained by reacting rubber with a halogen or halogens to a halogen content of 1 to 10 percent is compatible with other rubbers and can be vulcanized with sulfur. The patent relates to uses other than one as adhesives and a halogen content is limited to a range up to 10 percent. This is regarded as reasonable judging from rate of vulcanization and the decomposition of rubber. However, the lowly unsaturated rubbers having a halogen content of 10 percent or less gave no adhesive effect when they were applied as adhesives which might require similar properties.

A complete adhesion between a compounded lowly unsaturated rubber and a metal has been extremely difficult to obtain and has constituted an obstacle to the forming of industrial articles.

The chlorides of isoprene rubber, polybutadiene rubber, polyolefin polymers, etc. have been heretofore used to produce a bond between a compounded rubber and a metal. They have been effective in producing a bond between a metal and a compounded conventional rubber such as natural rubber, chloroprene rubber, butadiene-acrylonitrile rubber or the like, but have been unsatisfactory in an adhesion between a lowly unsaturated rubber and a metal. The adhesion between a compounded lowly unsaturated rubber and a metal has been a very important problem in the art to utilize the excellent characteristics of the compounded lowly unsaturated rubber.

It was also known prior to the present invention that a butadiene-methacrylic acid copolymer or a butadiene-styrene-methacrylic acid terpolymer was effective in producing an adhesion between a compounded rubber and a metal. Although these polymers were considered considerably effective in producing a bond between natural rubber or a styrene-butadiene rubber and a metal, they could not give a satisfactory effect on an adhesion between a lowly unsaturated rubber and a metal and between the same or different compounded rubbers, particularly between compounded lowly unsaturated rubbers such as ethylene-propylene-non-conjugated diolefin terpolymers or isoprene-isobutylene rubbers or between any one of such compounded lowly unsaturated rubbers and a compounded unsaturated rubber such as natural rubber, a styrene-butadiene rubber, a chloroprene rubber, an acrylonitrile-butadiene rubber or the like.

It is necessary for adhesive compositions for bonding a compounded rubber with a metal to have double bonds in such a degree as to allow the covulcanization thereof with rubber and contain a carboxyl group which is effective in forming a hydrogen bond between the compositions and the hydroxide layer on the surface of the metal. The above-mentioned butadiene-methacrylic acid copolymer and butadiene-styrene-methacrylic acid terpolymer satisfy these conditions, but are rather strikingly different in polarity from the lowly unsaturated rubbers and are scarcely compatible and their degree of covulcanization with the lowly unsaturated rubbers is insufficient to produce a bond. Therefore, they could not give a satisfactory adhesive effect.

An object of the present invention is to provide halogenated lowly unsaturated rubbers having an epoch-making adhesive property which overcome the disadvantages and deficiencies of the prior art adhesives.

Another object of the present invention is to provide adhesive compositions containing such a halogenated lowly unsaturated rubber.

A further object of the invention is to provide a process for producing such a halogenated lowly unsaturated rubber.

These and other objects and advantages of the present invention will become apparent to those skilled in the art from a consideration of the following description.

In accordance with the present invention, it has been found that 13–50 wt. percent halogenated ethylene-terpolymers have an epoch-making adhesive property to lowly unsaturated rubbers, which have been generally regarded as scarcely adhesive.

The present invention provides adhesive compositions comprising a halogenated lowly unsaturated rubber having a halogen content of 13 to 50 percent by weight, preferably 16 to 38 percent by weight, alone or preferably a mixture thereof with suitable vulcanizing compounding agents. The halogenated lowly unsaturated rubber may be obtained by reacting a terpolymer consisting of ethylene, a higher $\alpha$-olefin than ethylene and a small amount of a non-conjugated diolefin with a halogen or halogens.

The higher $\alpha$-olefin than ethylene is represented by the general formula:

$$R\text{—}CH\text{=}CH_2$$

wherein R is an alkyl group having 1 to 8 carbon atoms and is exemplified by propylene.

The non-conjugated diolefins which may be used in the present invention include, for example, divinylbenzene, 1,4-hexadiene, dicyclopentadiene, cyclooctadiene, etc.

The halogen may be chlorine or a mixture containing chlorine and bromine. The latter suitably contains 10 percent by weight or less of bromine.

The halogenated lowly unsaturated rubbers which may be used in the present invention can be obtained by dissolving the corresponding lowly unsaturated rubbers in a chlorinated hydrocarbon such as carbon tetrachloride, chloroform, trichloroethylene, tetrachloroethylene or monochlorobenzene and reacting the resultant solution with molecular chlorine and/or bromine (usually bromination is first carried out and chlorination is then carried out) in the presence or absence of light, a radical forming initiator, etc.

The present invention is characterized by the use of a 13 to 50 weight percent halogenated ethylene terpolymer. If an ethylene terpolymer having a halogen content of less than 13 percent is used, a satisfactory adhesive effect cannot be obtained. If the halogen content exceeds 50 percent by weight, the disintegration of rubber molecule is caused by the halogenation as can be seen from experimental results.

The present invention further provides adhesive compositions obtained by incorporating a mixed polymerizate of unsaturated compound and a lowly unsaturated rubber consisting of ethylene, a higher $\alpha$-olefin than ethylene and a non-conjugated diolefin into the above-mentioned halogenated lowly unsaturated rubber. A system consisting of 50 to 95 percent by weight of the halogenated lowly unsaturated rubber and 50 to 5 percent of the mixed polymerizate shows an excellent adhesive effect. The present invention also provides adhesive compositions comprising a mixed polymerizate obtained by polymerizing an unsaturated compound with the above-mentioned halogenated lowly unsaturated rubber or a mixture of said mixed polymerizate and the above-mentioned halogenated lowly unsaturated rubber and preferably a vulcanizing compounding agent.

The unsaturated compounds which may be used herein include acrylic acid, methacrylic acid, acrylic esters, methacrylic esters, acrylamide, methacrylamide, acrylonitrile, 2-vinylpyridine, 4-vinylpyridine, 2-methoxy-5-vinylpyridine, etc. Mixed polymerizates obtained by polymerizing 20 to 200 parts, preferably 30 to 150 parts of at least one of the above-mentioned unsaturated compounds with 100 parts of a lowly unsaturated rubber or halogenated lowly unsaturated rubber base may be advantageously used.

The above-mentioned mixed polymerizate of a lowly unsaturated rubber and an unsaturated rubber and an unsaturated compound according to the present invention may be usually obtained by dissolving a lowly unsaturated rubber or a halogenated lowly unsaturated rubber in a suitable organic solvent such as a hydrocarbon such as, for example, n-hexane, heptane, nonane, decane, benzene, toluene, xylene or the like or a chlorinated hydrocarbon such as carbon tetrachloride, chloroform, monochlorobenzene or the like, adding to the resultant solution a peroxide catalyst such as, for example, tert.-butyl peroxide, tert.-butyl benzoyl peroxide, lauroyl peroxide, benzoyl peroxide or the like or a hydroperoxide such as cumene hydroperoxide, heating the solution to a temperature of 60° C. or higher to form a radical, dropping an unsaturated compound into the heated solution and mixing and polymerizing these materials. Alternatively, the mixed polymerizate can be obtained by incorporating a peroxide or hydroperoxide into a lowly unsaturated rubber or a halogenated lowly unsaturated rubber by a suitable process such as by kneading them in a roller, subjecting the mixture to a heat-treatment, dissolving the treated mixture in the above-mentioned solvent, adding an unsaturated compound to the solution and copolymerizing the resultant mixture. The solution of the mixed polymerizate contains a graft polymer of the lowly unsaturated rubber and the unsaturated compound and a free polymer of the unsaturated compound, but the solution can be used in the present invention without separating the free polymer. If a mixture of the mixed polymerizate thus obtained and a halogenated lowly unsaturated rubber is used, an improved adhesive effect can be obtained. The mixing ratio of these two components may vary according to a specific adhered. For some adherents, a maximum bond strength can be obtained when the halogenated terpolymer content is higher. Mixtures predominantly containing the mixed polymer may be preferable for some polarities of the adherend.

The vulcanizing compounding agents which may be used in the adhesive compositions of the present invention include peroxides, hydroperoxides, sulfur, stannous chloride, phenol resin liquids such as a novolak resin produced by a condensation of tert.-butylphenol and formaldehyde and a resin obtained by a condensation of resorcinol and formaldehyde, vulcanizing agents such as metal oxides and bismaleimides and active fillers such as hydrosilicates, silicates and particularly carbon black. Chlorinated rubber, rubber hydrochloride, halogenated synthetic rubbers, etc. may be also used as a compounding agent.

The adhesive compositions of the present invention may be applied as follows: The adhesive compositions of the present invention are applied to the surface of a compounded curable rubber and the surface of an adherend containing a compounded rubber to be bonded to said compounded curable rubber to form an adhesive layer on the respective surface, and the adhesive layers on these surfaces are then contacted with each other to interpose the adhesive layers between the compounded rubber and the adherend, and finally the assembly is heated and vulcanized. Thus such a strong bond can be obtained between these adherends that a break of any adherend may occur in peeling test.

A primer is usually used to bond a metal to a rubber. Thus a primer is applied to the surface of a metal to form a primer layer, and the adhesive composition of the present invention is then applied to said primer layer to form an adhesive layer. A compounded uncured lowly unsaturated rubber is then contacted with the adhesive layer under pressure and the assembly is vulcanized. Thus a strong bond can be obtained that a break of the compounded rubber may occur in peeling test. The primer must not be necessarily the composition of the present invention.

The primer may be known chlorinated rubber, rubber hydrochloride, a halogen-containing rubber such as poly-2-chlorobutadiene or a halogenated butadiene polymer or copolymer such as brominated poly-2-chlorobutadiene, chlorinated polybutadiene in combination with a halide or a mixed polymer such as a mixed polymer of acrylic acid with an ethylene-propylene-non-conjugated diene terpolymer according to the present invention. The primer such as chlorinated rubber is orientated on the metal surface and can be strongly bonded to the metal. The adhesive composition can be strongly bonded to the primer because the composition has a similar solubility to that of the primer.

As the halogenated lowly unsaturated rubber in the adhesive composition of the present invention has a suitable polarity, the rubber is orientated in various compounded rubbers having different polarities and is cross-linked with the rubber molecule of the adherend by the liberation of hydrogen halide from the halide during vulcanization. Thus a strong primary bond is formed and an excellent adhesive effect is obtained. The presence of vulcanizing compounding agents and a reinforcing agent increases the cross-linking rate and the cross-linkage density in the adhesive composition layer and reinforces the adhesive layer itself. Thereby the adhesive effect is further increased.

In the adhesive composition of the present invention, also, a lowly unsaturated rubber or a halogenated lowly unsaturated rubber forms a strong primary bond by a cross-linkage with the same or different compounded rubber. The cross-linkage density of the adhesive composition is increased by polymerizing an unsaturated compound with these lowly unsaturated rubbers. The addition of vulcanizing compounding agents and the perfect cure of the adhesive composition prevent the reduction of a bond strength caused by the migration of a processing oil from the compounded rubber to be bonded.

The present invention is further illustrated by the following examples. The composition of the adherends $C_1$ to $C_6$ and the properties of vulcanizates thereof are shown in the following table. In all of the examples adhesion test was carried out after the adherends had been contacted with each other and the assembly had been subjected to heating and vulcanization by pressing it at 160° C. for 20 minutes.

| | Adherends | | | | | |
|---|---|---|---|---|---|---|
| | $C_1$ | $C_2$ | $C_3$ | $C_4$ | $C_5$ | $C_6$ |
| Composition: | | | | | | |
| Ethylene-propylene terpolymer "Royalene 301" | 100 | 100 | | | | |
| Isoprene-isobutylene rubber ("Polysarbutyl 301") | | | 100 | | | |
| Natural rubber ("Smoked Sheet No. 1") | | | | 50 | | |
| Styrene-butadiene rubber ("JSR 1502") | | | | | 100 | |
| Chloroprene rubber ("Neoprene W") | | | | | | 100 |
| Carbon Black (EPC) | 50 | 50 | 80 | 50 | 60 | 50 |
| Naphthene hydrocarbons | 10 | 50 | | | | |
| Zinc oxide | 5 | 5 | 5 | 10 | 7 | 5 |
| Tetramethylthiuram monosulfide | 1.5 | 1.5 | | | | |
| Mercaptobenzothiazole | 0.5 | 0.5 | 1 | | | |
| Stearic acid | 1.0 | 1.0 | 2 | 1.5 | | |
| Sulfur | 1.5 | 1.5 | 2 | 2.5 | 2. | 1 |
| Vaseline | | | | 2 | | |
| Tetramethylthiuram disulfide | | | 1 | | 0.3 | |
| Pine tar | | | | 2 | | |
| N-cyclohexyl-2-benzothiazole sulfenamide | | | 0.7 | | | |
| Aromatic hydrocarbons | | | | | 6 | 4 |
| Dibenzothiazyl disulfide | | | | | 1.2 | |
| Magnesium oxide | | | | | | 4 |
| 2-mercaptoimidazoline | | | | | | 0.8 |
| Properties:[1] | | | | | | |
| Modulus at 300% extension (kg./cm.²) | 163 | 114 | 61 | 120 | 168 | 219 |
| Tensile strength (kg./cm.²) | 214 | 153 | 121 | 273 | 240 | 250 |
| Elongation (percent) | 390 | 440 | 580 | 550 | 390 | 360 |
| Hardness | 66 | 55 | 59 | 58 | 74 | 66 |

[1] The properties of each adherend were determined relating to the vulcanizates of $C_1$ and $C_2$ obtained by press-curing at 160° C. for 20 minutes, the vulcanizates of $C_3$, $C_5$ and $C_6$ obtained by press-curing at 147° C. for 20 minutes and the vulcanizates of $C_4$ obtained by press-curing at 141° C. for 10 minutes.

COMPARATIVE EXAMPLE

| | Adhesive compositions | | |
|---|---|---|---|
| Components | $A_1$ | $A_2$ | $A_3$ |
| Halogenated ethylene-propylenedicyclopentadiene terpolymer | [1] 100 | [2] 100 | [3] 100 |
| Carbon black (EPC) [4] | 40 | 40 | 40 |
| Zinc oxide | 5 | 5 | 5 |
| Mercaptobenzothiazol | 1 | 1 | 1 |
| Tetramethylthiuram disulfide | 3 | 3 | 3 |
| Toluene | 1,341 | 1,341 | 1,341 |

[1] Combined chlorine=8.5 percent by weight.
[2] Combined chlorine=5.0 percent by weight.
[3] Combined chlorine=5.0 percent by weight. Combined bromine=2.5 percent by weight.
[3] Combined chlorine=18.3 percent by weight.
[4] Channel black.

Compounded rubbers were bonded to each other with the above adhesive compositions $A_1$ to $A_3$ and the assemblies were subjected to press-vulcanization at 160° C. for 20 minutes. The assemblies were then subjected to 180° peeling test according to the method described in JIS K–6301. As can be seen from the following table, the adhesive compositions $A_1$ and $A_2$ having a halogen content of lower than 10 percent gave a far lower bond strength than the adhesive composition $A_3$ according to the present invention. Judging from the state of adhesion break, in case of $A_3$ such a firm bond can be produced that a break of the bonded rubber may occur in peeling test. On the other hand, in case of $A_1$ and $A_2$, peeling occurred at the interface between the adherend surface and the adhesive layer. Therefore, an adhesive consisting of a lowly unsaturated rubber having a halogen content of lower than 10 percent cannot give a satisfactory adhesive effect. Thus the unique effect of the compositions according to the present invention is remarkable. This fact is found also in the bonding between a compounded rubber and another adherend. For the purpose of the present invention a polymer having a halogen content of at least 10 percent must be used.

| | Adhesive compositions | | |
|---|---|---|---|
| Adherend | $A_1$, kg./cm.² | $A_2$, kg./cm.² | $A_3$, kg./cm.² |
| $C_1$–$C_1$ | 6.3 | 2.3 | (R) 8.0 |
| $C_2$–$C_4$ | 2.5 | 2.8 | (R) 4.2 |
| $C_2$–$C_5$ | 1.2 | 1.5 | (R) 3.8 |
| $C_2$–$C_6$ | 0.8 | 1.0 | (R) 4.5 |

NOTE.—(R) represents a break of the adherend (compounded rubber).

It will be deduced from the above experimental results that, if a halogen content is lower than 13 percent by weight, an adherend having a high polarity is difficult to orientate against a compounded rubber owing to the unsuitable polarity of the adhesive composition and the cross-linkage of the adhesive layer is insufficient for the purpose of the present invention whereby a sufficient adhesive effect will not be obtained.

EXAMPLE 1

Adhesive composition $B_1$
Halogenated ethylene-propylene-divinylbenzene terpolymer (chlorine content: 37%) _____ 100
Carbon black (EPC) _____ 20
Benzotrichloride _____ 2
Stannous chloride _____ 2.5
n-Hexane _____ 520
Toluene _____ 600

Compounded rubbers were bonded to each other with the above adhesive composition $B_1$. As shown in the following table, particularly in a bond between different compounded rubbers, the adhesive composition produced a remarkably superior adhesion compared with toluene treatment and the use of rubber dough which were used for comparison.

| Adherends | Adhesive compositions | | |
|---|---|---|---|
| | $B_1$ of the present invention, kg./cm.² | Toluene treatment, kg./cm.² | Rubber dough, kg./cm.² |
| $C_1$-$C_1$ | (R) 8.0 | (R) 8.0 | (R) 8.0 |
| $C_1$-$C_3$ | (R) 4.2 | 2.2 | 2.8 |
| $C_1$-$C_4$ | (R) 4.5 | 1.0 | 0.8 |
| $C_1$-$C_5$ | (R) 4.0 | 0.8 | 0.5 |
| $C_1$-$C_6$ | (R) 5.2 | 0.5 | 0.4 |
| $C_3$-$C_4$ | (R) 3.8 | 0.7 | 0.7 |
| $C_3$-$C_6$ | (R) 4.5 | 0.4 | 0.5 |

NOTE.—(R) represents a break of compounded rubbers to be bonded and means that a bond was complete.

Toluene treatment is a process of bonding which comprises applying toluene to both the surfaces of an adherend to make them adhesive.

Rubber dough means a 10 percent solution of the curable compounded rubber $C_1$ in toluene which may be used as an adhesive.

EXAMPLE 2

Adhesive composition $B_2$

| | |
|---|---|
| Halogenated ethylene-propylene - dicyclopentadiene terpolymer (chlorine content: 21%) | 100 |
| Hydrosilicate | 10 |
| Zinc oxide | 5 |
| Magnesium oxide | 4 |
| Di-o-tolylthiourea | 0.2 |
| 2-mercaptoimidazoline | 0.5 |
| Chloroform | 500 |
| Toluene | 508 |

Compounded rubbers were bonded to each other with the above adhesive composition $B_2$. As shown in the following table, in a bond between compounded rubbers the adhesive composition produced a superior adhesion compared with toluene treatment and a mixture of rubber dough and an isocyanate.

| Adherends | Adhesive compositions | | |
|---|---|---|---|
| | $B_2$ of the present invention, kg./cm.² | Toluene treatment, kg./cm.² | Mixture¹ of rubber dough and isocyanate, kg./cm.² |
| $C_1$-$C_2$ | (R) 5.6 | 4.5 | 5.0 |
| $C_1$-$C_4$ | (R) 4.3 | 1.0 | 1.2 |
| $C_1$-$C_6$ | (R) 4.8 | 0.5 | 0.8 |
| $C_1$-nylon woven fabric | (R) 6.5 | 0.8 | 3.0 |

¹ The mixing was prepared by mixing 100 parts by weight of rubber contained in the rubber dough and 5 parts by weight of an isocyanate

EXAMPLE 3

Adhesive composition $B_3$

| | |
|---|---|
| Halogenated ethylene-propylene - dicyclopentadiene terpolymer (chlorine content: 18%, bromine content: 5.5%) | 100 |
| Zinc oxide | 5 |
| Dicumyl peroxide | 0.5 |
| N,N'-m-phenylenebismaleimide | 2.0 |

Compounded rubbers were bonded to each other with the above adhesive composition $B_3$, which produced a superior adhesion compared with the toluene treatment, rubber dough or a mixture of rubber dough and an isocyanate in Examples 1 and 2.

Adhesive composition B3 according to
Adherends: the present invention (kg./cm.²)
$C_1$-$C_4$ _____ (R) 4.5
$C_3$-$C_4$ _____ (R) 4.0
$C_1$-$C_6$ _____ (R) 5.6
$C_3$-$C_6$ _____ (R) 4.7

EXAMPLE 4

Adhesive composition D (primer)

| | |
|---|---|
| Chlorinated rubber (chlorine content: 65%) | 100 |
| Magnesium oxide | 1 |
| Zinc oxide | 0.5 |
| Methyl isobutyl ketone | 400 |

Chlorinated rubber was dissolved in methyl isobutyl ketone. Into the solution magnesium oxide and zinc oxide were then added and uniformly dispersed.

Adhesive composition $B_4$

| | |
|---|---|
| Halogenated ethylene - propylene - dicyclopentadiene terpolymer (chlorine content: 30%) | 60 |
| Chlorinated rubber (chlorine content: 65%) | 40 |
| Dicumyl peroxide | 1 |
| N,N'-m-phenylenebismaleimide | 4 |
| Xylene | 400 |

The above halogenated terpolymer and chlorinated rubber were dissolved in xylene. Dicumyl peroxide and N,N'-m-phenylenebismaleimide were uniformly dispersed in the solution.

Adherends $C_1$ and $C_2$ were bonded to various metals with the above-mentioned adhesive compositions D and $B_4$. The resultant bond was then subjected to parallel peeling test according to JIS K–6301. The result is shown in the following table.

$E_1$ and $E_2$ for comparison were the adhesives obtained by mixing 10 parts of a 20% solution of a triisocyanate with 100 parts of a 20% solution of the adherends $C_1$ and $C_2$, respectively, in toluene. The metals used were mild steel (having a composition prescribed in JIS SS-34), brass (having a composition of Cu/Zn=60/40), stainless steel (containing 18% of Cr), copper (having a purity of 99.9%) and gun metal (Cu: 87%, Sn: 10%, Zn: 2% and impurities: 1%).

| Combinations of adherends | Adhesive compositions D and $B_4$ | | | | $E_1$ or $E_2$ for comparison | | | | |
|---|---|---|---|---|---|---|---|---|---|
| | Kg./cm.² | R | RC | M | | Kg./cm.² | R | RC | M |
| $C_1$-mild steel | 72.8 | 98 | 2 | 0 | | 25 | 0 | 40 | 60 |
| $C_1$-brass | 65.5 | 95 | 5 | 0 | | 30 | 0 | 50 | 50 |
| $C_1$-stainless steel | 62.0 | 88 | 12 | 0 | $D_1$ | 15 | 0 | 10 | 90 |
| $C_1$-copper | 50.0 | 82 | 18 | 0 | | 10 | 0 | 10 | 90 |
| $C_1$-gun metal | 52.5 | 80 | 20 | 0 | | 15 | 0 | 15 | 85 |
| $C_2$-mild steel | 68.0 | 98 | 2 | 0 | | 35 | 5 | 50 | 45 |
| $C_2$-brass | 60.6 | 95 | 5 | 0 | | 30 | 8 | 55 | 37 |
| $C_2$-stainless steel | 55.0 | 88 | 12 | 0 | $D_2$ | 15 | 0 | 45 | 55 |
| $C_2$-copper | 52.8 | 80 | 20 | 0 | | 15 | 0 | 40 | 60 |
| $C_2$-gun metal | 58.5 | 85 | 15 | 0 | | 18 | 0 | 40 | 60 |

NOTE.—R represents rubber break; RC represents peeling at the interface between rubber and an adhesive; and M represents peeling at the interface between a metal and adhesive. The figures represent the percentages of peeling, respectively.

The above results show that the edhesives according to the present invention are far superior to $E_1$ and $E_2$ for comparison.

EXAMPLE 5

Adhesive composition $B_5$

| | |
|---|---|
| Halogenated ethylene - propylene - dicyclopentadiene terpolymer (chlorine content: 20%, bromine content: 3%) | 65 |
| Chlorinated rubber (chlorine content: 65%) | 35 |
| Carbon black ("Seast 305") | 25 |
| Tetramethylthiuram disulfide | 2 |
| Xylene | 400 |

The above halogenated terpolymer and chlorinated rubber were dissolved in xylene. Carbon black and tetramethylthiuram disulfied were uniformly dispersed in the solution.

The same bond test as in Example 4 was carried out with the adhesive composition D of Example 4 and the above composition $B_5$. The result as summarized in the following table showed that the adhesives according to the present invention were clearly superior to the adhesives $E_1$ and $E_2$ for comparison in Example 4.

| Combinations of adherends | Adhesive compositions D and $B_5$ | | | |
|---|---|---|---|---|
| | Kg./cm.² | R | RC | M |
| $C_1$-mild steel | 80.0 | 100 | 0 | 0 |
| $C_1$-brass | 74.8 | 98 | 2 | 0 |
| $C_1$-stainless steel | 75.0 | 95 | 5 | 0 |
| $C_1$-copper | 74.0 | 95 | 5 | 0 |
| $C_1$-gun metal | 65.0 | 90 | 10 | 0 |
| $C_2$-mild steel | 70.5 | 95 | 5 | 0 |
| $C_2$-stainless steel | 68.7 | 90 | 10 | 0 |
| $C_2$-copper | 60.0 | 82 | 18 | 0 |
| $C_2$-gun metal | 62.8 | 88 | 12 | 0 |

EXAMPLE 6

Adhesive $B_6$

| | |
|---|---|
| Halogenated ethylene - propylene - divinylbenzene (chlorine content: 16%) | 20 |
| Chlorinated rubber (chlorine content: 65%) | 80 |
| Zinc oxide | 1 |
| p-Quinone dioxime | 2 |
| Red lead | 1 |
| Xylene | 400 |

The above halogenated terpolymer and chlorinated rubber were dissolved in xylene. Zinc oxide, p-quinone dioxime and red lead were uniformly dispersed in the solution. The same bond test as in Example 4 was carried out with the adhesive D of Example 4 and the above-mentioned adhesive $B_6$. As shown in the following table, a satisfactory result was obtained.

| Compositions of adherends | Adhesive compositions D and $B_6$ | | | |
|---|---|---|---|---|
| | Kg./cm.² | R | RC | M |
| $C_1$-mild steel | 70.4 | 85 | 15 | 0 |
| $C_1$-brass | 62.8 | 82 | 18 | |

EXAMPLE 7

Adhesive $B_7$

| | |
|---|---|
| Halogenated ethylene - propylene - dicyclopentadiene terpolymer (chlorine content: 42%) | 45 |
| Chlorinated rubber (chlorine content: 65%) | 55 |
| Xylene | 400 |

The halogenated terpolymer and chlorinated rubber were dissolved in xylene. The same bond test as in Example 4 was carried out with the adhesive composition D of Example 4 and the above-mentioned $B_7$. The following preferable bond was produced.

| Compositions of adherends | Adhesive compositions D and $B_7$ | | | |
|---|---|---|---|---|
| | Kg./cm.² | R | RC | M |
| $C_1$-mild steel | 68.0 | 60 | 40 | 0 |
| $C_1$-brass | 61.5 | 75 | 25 | 0 |

EXAMPLE 8

| | |
|---|---|
| Ethylene-propylene-dicyclopentadiene terpolymer | 100 |
| Methacrylic acid | 50 |
| Benzoyl peroxide | 0.5 |
| Toluene | 1,530 |

The above blend was heated and polymerized according to the usual method to form a mixed polymerizate at a polymerization rate of 95 percent.

The adhesive composition $B_8$ was then prepared by uniformly dispersing a halogenated lowly unsaturated rubber as a vulcanizing compounding agent in the polymer.

Adhesive composition $B_8$

| | |
|---|---|
| The above-mentioned mixed polymerizate solution | 1,000 |
| Halogenated ethylene - propylene - dicyclopentadiene terpolymer (chlorine content: 43%) | 50 |
| Carbon black (EPC) | 40 |
| Benzotrichloride | 2 |
| Stannous chloride | 2.5 |
| Carbon tetrachloride | 355 |
| Toluene | 500 |

Compounded rubbers were bonded to each other with the adhesive composition $B_8$, which gave a superior bond between different compounded rubbers to toluene treatment and the use of rubber dough.

| Adherends | Adhesives | | |
|---|---|---|---|
| | $B_8$ of the present invention, kg./cm.² | Toluene treatment, kg./cm.² | Rubber dough, kg./cm.² |
| $C_2$-$C_3$ | (R) ¹ 4.0 | 1.8 | 2.0 |
| $C_2$-$C_4$ | (R) ¹ 3.8 | 0.7 | 0.6 |
| $C_2$-$C_5$ | (R) ¹ 3.5 | 0.6 | 0.5 |
| $C_2$-$C_6$ | (R) ¹ 4.5 | 0.4 | 0.5 |

¹ Or higher.

NOTE.—(R) represents a break of compounded rubbers to be bonded.

EXAMPLE 9

Adhesive composition $B_9$

| | |
|---|---|
| Halogenated ethylene - propylene - dicyclopentadiene terpolymer (chlorine content: 16%, bromine content: 3%) | 100 |
| 4-vinylpyridine | 25 |
| 2-methoxy-5-vinylpyridine | 40 |
| Benzoyl peroxide | 0.5 |
| Toluene | 1,480 |

The above blend was polymerized according to the usual method to obtain a polymerization rate of 90 percent. A rubber was bonded to another rubber, nylon woven fabric and rayon woven fabric with the adhesive composition $B_9$, respectively. The obtained results are shown in the following table. The adhesive composition $B_9$ gave a far superior adhesive effect to an adhesive composition comprising rubber dough alone or a mixture thereof with an isocyanate.

| Adherends | Adhesives | | |
|---|---|---|---|
| | $B_9$ of the present invention, kg./cm.² | Rubber dough, kg./cm.² | Mixture of rubber dough and isocyanate, kg./cm.² |
| $C_2$-$C_6$ | (R) ¹ 4.2 | 0.5 | 0.7 |
| $C_2$-nylon woven fabric | (R) ¹ 4.0 | 0.8 | 2.8 |
| $C_2$-rayon woven fabric | (R) ¹ 4.5 | 1.5 | 3.0 |

¹ Or higher.

NOTE.—(R) represents a break of compounded rubbers to be bonded.

EXAMPLE 10

150 grams of an ethylene-propylene-dicyclopentadiene terpolymer was dissolved in 2,350 grams of carbon tetrachloride. 10 grams of bromine was dropped into the solution at 30° to 40° C. in 20 minutes. Chlorination was then carried out by introducing 600 grams of chlorine for 6 hours while keeping the temperature of the solution at 60° to 65° C. 193 grams of a dry precipitate was obtained by adding methanol to the reaction mixture. The resultant halogenated lowly unsaturated rubber had a bromination degree of 5.5 percent by weight and a chlorination degree of 18 percent by weight.

EXAMPLE 11

200 grams of an ethylene-propylene-dicyclopentadiene terpolymer was dissolved in 3,333 grams of carbon tetrachloride. Chlorination was carried out by introducing 300 grams of chlorine for 3 hours while irradiating a light at 60° to 65° C. 320 grams of a dry precipitate was obtained by adding methanol to the reaction mixture. An analysis showed that the product was a lowly unsaturated rubber containing 37 percent by weight of chlorine.

We claim:
1. A mixture comprising 50 to 95 percent by weight of a halogenated terpolymer having a halogen content of 13 to 50 percent by weight prepared by reacting a terpolymer consisting of ethylene, a higher α-olefin than ethylene and a non-conjugated diolefin with chlorine, bromine or a mixture thereof, and 50 to 5 percent by weight of a mixed polymerizate produced by polymerizing a mixture of 100 parts by weight of the above-mentioned unhalogenated terpolymer and 20 to 200 parts by weight of at least one unsaturated compound selected from the group consisting of acrylic acid, methacrylic acid, acrylic esters, methacrylic esters, 4-vinylpyridine, 2-vinylpyridine and 2-methoxy-5-vinylpyridine.

2. A mixture according to claim 1, wherein the terpolymer is an ethylene-propylene-dicyclopentadiene terpolymer.

3. An adhesive composition comprising the mixture according to claim 1 as the main component and if necessary, suitable vulcanizing compounding agents.

4. An adhesive composition according to claim 3, wherein the terpolymer is an ethylene-propylene-dicyclopentadiene terpolymer.

5. A mixed polymerizate prepared by polymerizing a mixture of 100 parts by weight of a halogenated terpolymer defined in claim 1 and 20 to 200 parts by weight of at least one unsaturated compound defined in claim 1.

6. A mixed polymerizate according to claim 5, wherein the terpolymer is an ethylene-propylene-dicyclopentadiene terpolymer.

7. A mixture comprising up to 50 percent by weight of a halogenated terpolymer as defined in claim 1 and at least 50 percent by weight of a mixed polymerizate according to claim 5.

8. A mixture according to claim 7, wherein the terpolymer is an ethylene-propylene-dicyclopentadiene terpolymer.

9. An adhesive composition comprising the mixture according to claim 7 as the main component and if necessary, suitable vulcanizing compounding agents.

10. An adhesive composition according to claim 9, wherein the terpolymer is an ethylene-propylene-dicyclopentadiene terpolymer.

References Cited

UNITED STATES PATENTS

| | | | |
|---|---|---|---|
| 3,408,424 | 10/1968 | Barkhuff et al. | 260—878 |
| 3,454,462 | 7/1969 | Hawley et al. | 161—243 |
| 3,483,273 | 12/1969 | Prucnal et al. | 260—878 |
| 3,522,831 | 8/1970 | Torti et al. | 152—330 |
| 3,524,826 | 8/1970 | Kresge et al. | 260—5 |
| 3,528,943 | 9/1970 | Goldberg et al. | 260—41 |
| 3,367,827 | 2/1968 | Gallagner | 161—227 |

OTHER REFERENCES

Ravve, A. and Khannis, J. T.: Studies on Grafting Glycidyl Methacrylate on Polyvinyl Chloride Backbones, Journal of Polymer Science, vol. 61, pp. 185–187.

JOSEPH L. SCHOFER, Primary Examiner

R. S. BENJAMIN, Assistant Examiner

U.S. Cl. X.R.

156—333: 260—80.78, 878